United States Patent
Fischer et al.

(10) Patent No.: US 10,676,060 B2
(45) Date of Patent: Jun. 9, 2020

(54) METHOD FOR FOLDING AN AIRBAG, PRESSING DEVICE FOR SHAPING AIRBAG PACKAGES, AND AIRBAG PACKAGE

(71) Applicants: TRW AUTOMOTIVE GMBH, Alfdorf (DE); TRW VEHICLE SAFETY SYSTEMS INC., Washington, MI (US)

(72) Inventors: Anton Fischer, Schechingen-Leinweiler (DE); Michelle Blackson, Dryden, MI (US); Dylan Moran, Rochester Hills, MI (US); Blair Morrison, Rochester Hills, MI (US)

(73) Assignees: TRW AUTOMOTIVE GMBH, Alfdorf (DE); TRW VECHICLE SAFETY SYSTEMS INC., Washington, MI (US)

( * ) Notice: Subject to any disclaimer, the term of this patent is extended or adjusted under 35 U.S.C. 154(b) by 125 days.

(21) Appl. No.: 15/753,334

(22) PCT Filed: Aug. 19, 2016

(86) PCT No.: PCT/EP2016/069678
§ 371 (c)(1),
(2) Date: Feb. 19, 2018

(87) PCT Pub. No.: WO2017/029388
PCT Pub. Date: Feb. 23, 2017

(65) Prior Publication Data
US 2018/0236965 A1 Aug. 23, 2018

(30) Foreign Application Priority Data
Aug. 20, 2015 (DE) .................. 10 2015 010 789

(51) Int. Cl.
*B60R 21/237* (2006.01)
*B60R 21/232* (2011.01)

(52) U.S. Cl.
CPC .......... *B60R 21/237* (2013.01); *B60R 21/232* (2013.01); *B60R 2021/2375* (2013.01)

(58) Field of Classification Search
CPC ..................... B60R 21/237; B60R 21/2375
See application file for complete search history.

(56) References Cited

U.S. PATENT DOCUMENTS 5,022,676 A * 6/1991 Rogerson ............... B60R 21/237
280/728.2
5,360,387 A * 11/1994 Baker .................... B60R 21/237
280/243

(Continued)

FOREIGN PATENT DOCUMENTS

| EP | 2594441 | 5/2013 | |
| WO | WO-2008069704 A1 * | 6/2008 | ........... B60R 21/237 |
| WO | WO-2019076666 A1 * | 4/2019 | ........... B60R 21/237 |

*Primary Examiner* — Nicole T Verley
(74) *Attorney, Agent, or Firm* — Tarolli, Sundheim, Covell & Tummino LLP

(57) ABSTRACT

In a method of folding an airbag (10) for a vehicle occupant restraint system, especially of curtain-type side airbag, to form an airbag package (12'), the airbag (10) is rolled and/or folded to form an airbag roll (12) having a first volume ($V_1$). The airbag roll (12) is fed to a pressing device (14) in which the airbag roll (12) is compressed to form an airbag package (12') having a second volume ($V_2$) which is smaller than the first volume ($V_1$). The airbag roll (12) and, resp., the airbag package (12') is heated within the pressing device (14) and the airbag package (12') is cooled, with the airbag package (12') retaining the second volume ($V_2$) when it is removed from the pressing device (14; 114). The pressing device (14) includes a pressing mold or a molding shaft (18) whose height substantially corresponds to the desired height of the (Continued)

finished airbag packages (12'), a heating unit (20) for heating the airbag packages (12') and a cooling device (22) for cooling the airbag packages (12').

9 Claims, 13 Drawing Sheets

(56) References Cited

U.S. PATENT DOCUMENTS

| | | | | |
|---|---|---|---|---|
| 5,493,846 | A * | 2/1996 | Baker | B60R 21/237 |
| | | | | 280/743.1 |
| RE35,265 | E * | 6/1996 | Baker | B60R 21/237 |
| | | | | 280/743.1 |
| 6,110,094 | A * | 8/2000 | Wallentin | B60R 21/237 |
| | | | | 280/728.1 |
| 6,422,588 | B2 * | 7/2002 | Hieber | B60R 21/237 |
| | | | | 280/728.1 |
| 6,432,033 | B1 * | 8/2002 | Salzmann | B60R 21/237 |
| | | | | 280/728.1 |
| 6,588,793 | B2 * | 7/2003 | Rose | B60R 21/2171 |
| | | | | 280/728.2 |
| 6,607,210 | B2 * | 8/2003 | Eckert | B60R 21/233 |
| | | | | 280/732 |
| 7,163,232 | B2 * | 1/2007 | Yokoyama | B60R 21/201 |
| | | | | 280/730.2 |
| 8,806,773 | B2 * | 8/2014 | Nebel | B60R 21/237 |
| | | | | 34/357 |
| 9,994,187 | B2 * | 6/2018 | Okuhara | B60R 21/232 |
| 10,239,482 | B2 * | 3/2019 | Hepp | B60R 21/237 |
| 2001/0017456 | A1 | 8/2001 | Hieber et al. | |
| 2015/0130167 | A1 | 5/2015 | Kunkel et al. | |
| 2018/0229685 | A1 * | 8/2018 | Song | B60R 21/237 |
| 2018/0236965 | A1 * | 8/2018 | Fischer | B60R 21/237 |

\* cited by examiner

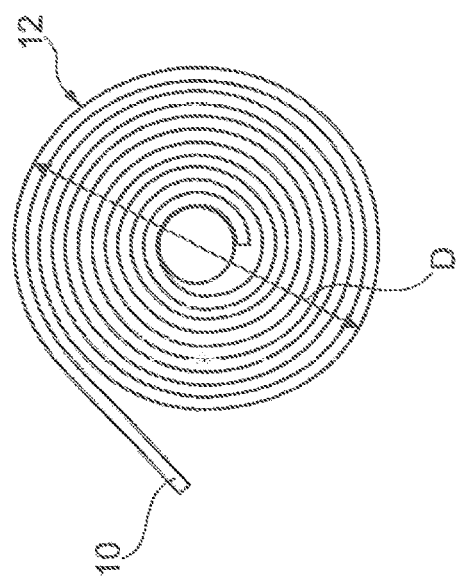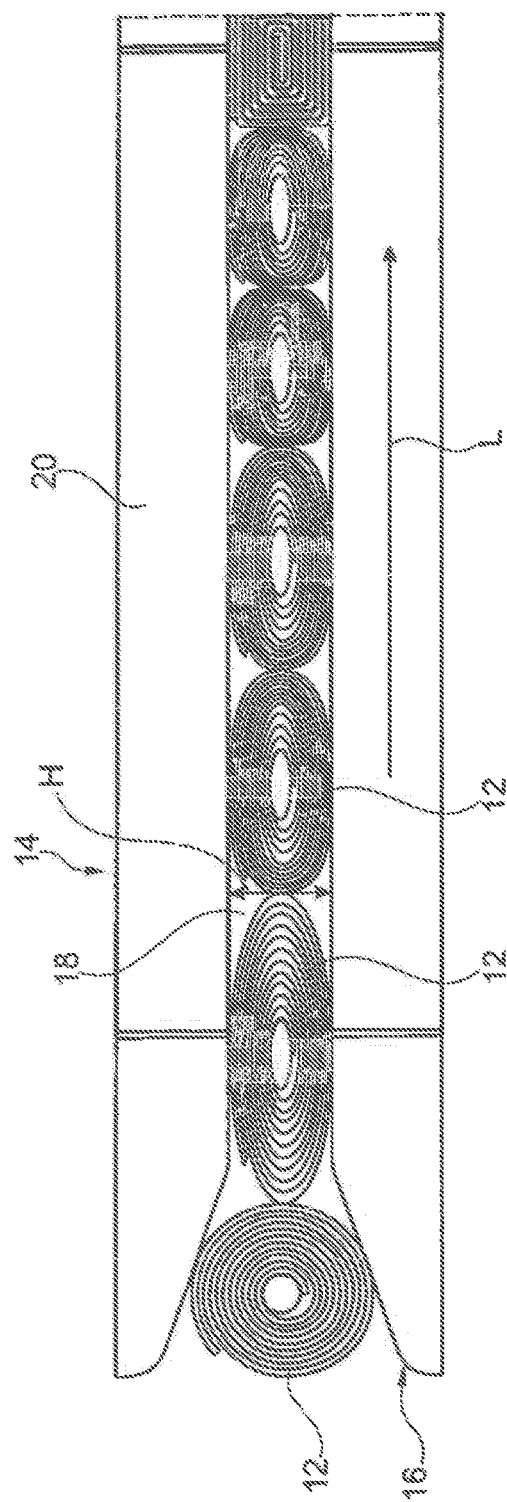

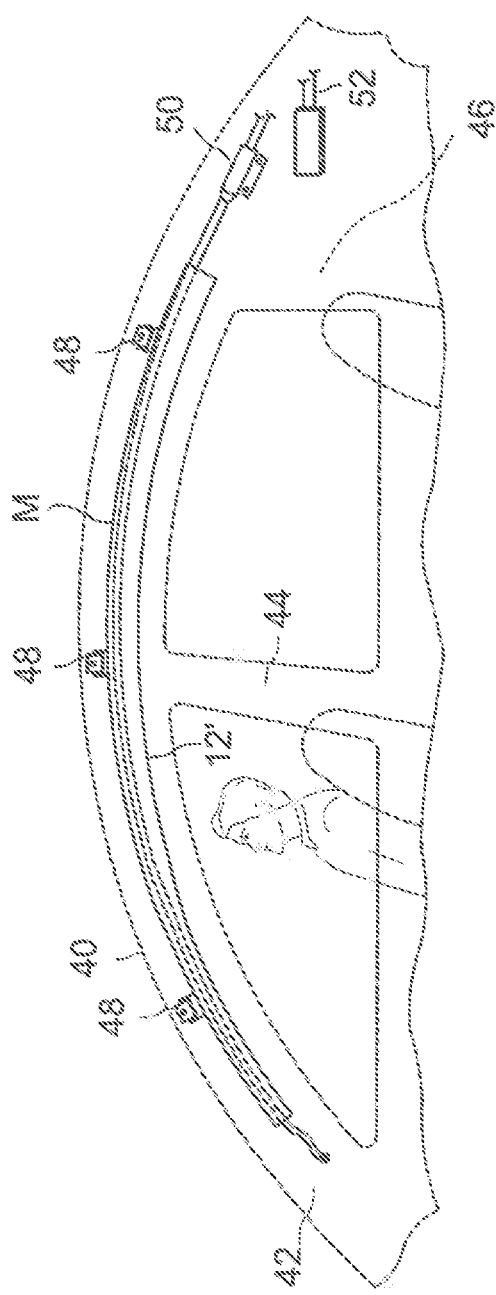
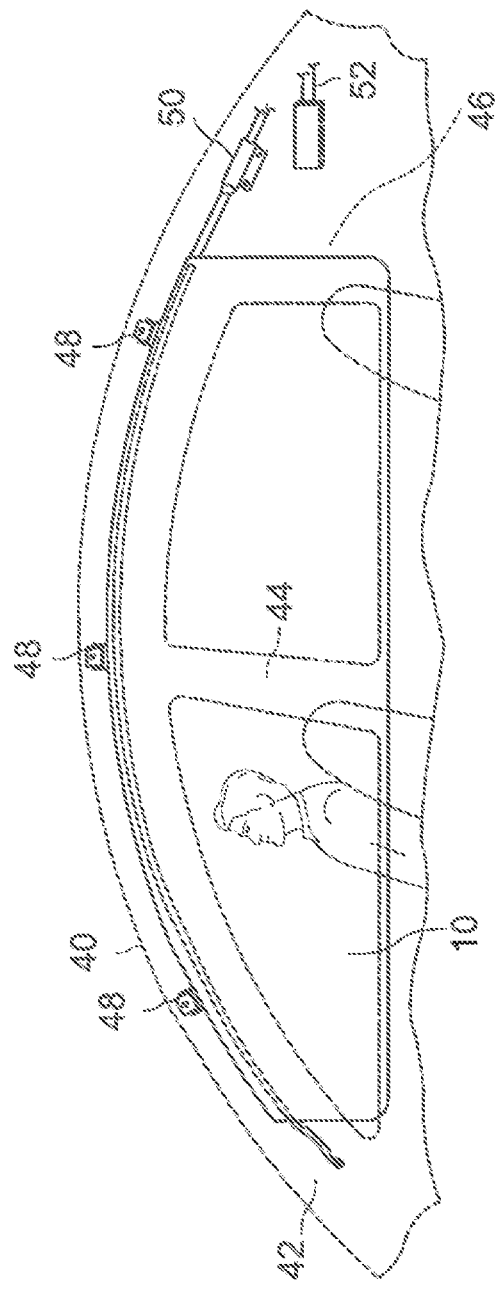

Fig. 12b
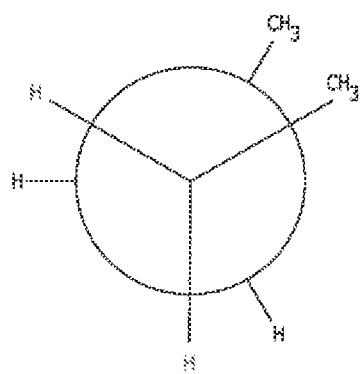 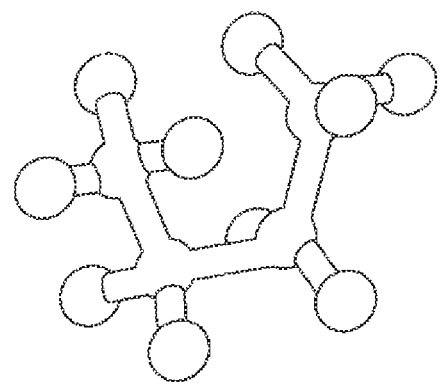
Fig. 12c
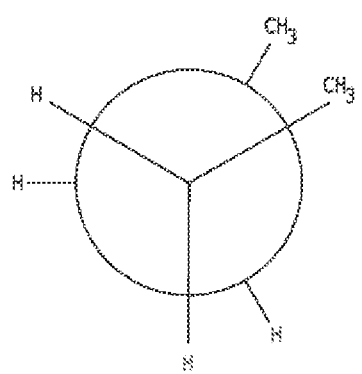 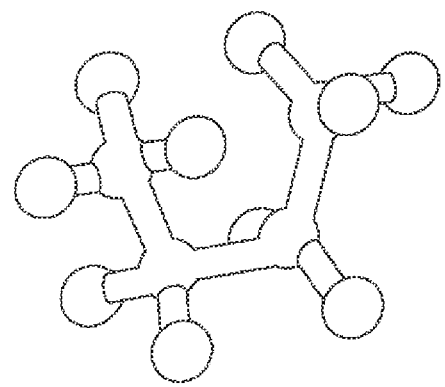
Fig. 12d
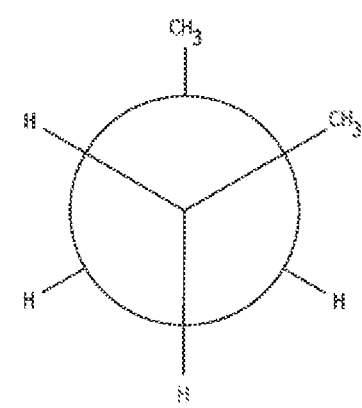 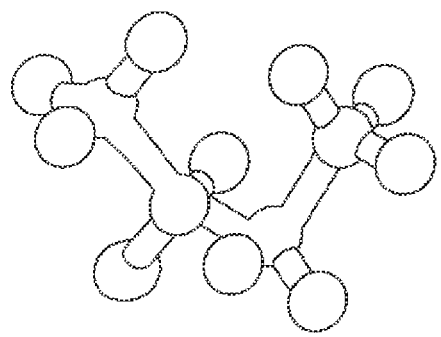

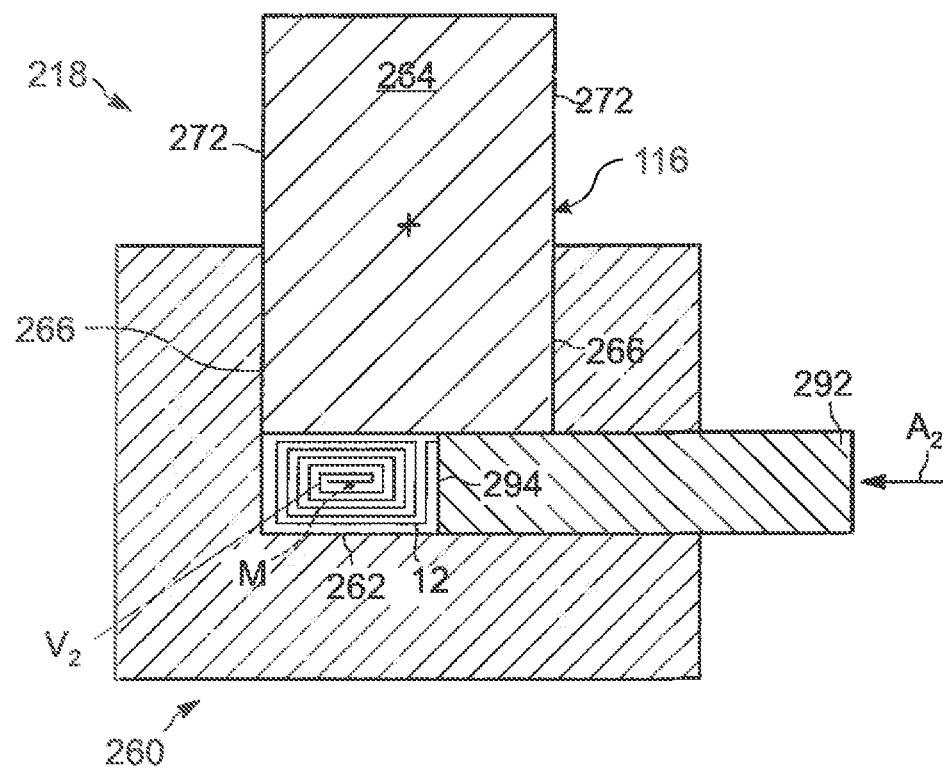

METHOD FOR FOLDING AN AIRBAG, PRESSING DEVICE FOR SHAPING AIRBAG PACKAGES, AND AIRBAG PACKAGE

This application corresponds to PCT/EP2016/069678, filed Aug. 19, 2016, which claims the benefit of German Application No. 10 2015 010 789.6, filed Aug. 20, 2015, the subject matter of which are incorporated herein by reference in their entirety.

BACKGROUND OF THE INVENTION

The invention relates to a method of folding an airbag for a vehicle occupant restraint system to form an airbag package. Furthermore, the invention relates to a pressing device for forming airbag packages as well as to an airbag package for mounting in a vehicle occupant restraint system comprising a rolled airbag.

Airbags are used for the protection of vehicle occupants in various forms within the vehicle, for example as a driver airbag within the steering wheel, as a passenger airbag or knee airbag within an instrument panel or as a side airbag provided in the area of the backrests or the doors or as a curtain-type airbag in the area of the roof rail from where it will deploy between the vehicle occupants and the sidewall of the vehicle.

In order to accommodate airbags in a space-saving manner, e.g. behind an interior lining of a vehicle, they are folded prior to being mounted in the vehicle. Upon activating the vehicle occupant restraint system, gas flows into the airbag, thus causing the latter to automatically deploy.

A common way of folding which is employed especially with large-area side airbags consists in rolling the airbag from its lower edge to its upper edge (both being related to the mounting state and the inflated state). It is also possible to combine rolling and folding when folding the airbag and, for example, to first fold a portion of the airbag and then roll the same together with the remaining airbag or to only fold a portion of the airbag without rolling the same.

Such rolled and/or folded airbag takes a rather round cross-sectional shape, which requires an airbag housing having an appropriate mounting depth. In order to be able to position the airbag package also in areas having a small mounting depth between the car body and the interior lining, flatter airbag packages are desired. Mere folding of the airbag in the desired size requires additional fixation of the folded airbag, however, so as to prevent the airbag package from deploying or losing its shape already during mounting, thus impeding insertion into a housing.

SUMMARY OF THE INVENTION

It is the object of the invention to provide a method of folding an airbag by which a shape of the completed airbag package can be achieved which is more favorable for mounting. It is a further object of the invention to provide such airbag package as well as a pressing device for forming airbag packages.

For achieving the object, a method of folding an airbag for a vehicle occupant restraint system into an airbag package is provided which includes the steps stated in claim 1. Accordingly, the airbag is rolled and/or folded into an airbag roll, with the airbag roll taking a first volume. The airbag roll is fed to a pressing device and the airbag roll is compressed to form an airbag package taking a second volume which is smaller than the first volume. The airbag package is heated in the pressing device and is subsequently cooled, wherein the airbag package retains the second volume when it is removed from the pressing device.

The airbag package is heated especially after compressing to the final height and the second volume. Said heating is comparable to ironing of the airbag rolls or airbag packages and promotes permanent fixation of the airbag package in the desired final shape.

Heating is advantageously carried out up to a temperature and for a period of time sufficient to maintain the airbag package permanently stable in the shape obtained by compressing and in the second volume.

For this purpose, for example a temperature of at least 80° C. and especially between 80° C. and 170° C., preferably between 80° C. and 150° C., especially preferred between 135° C. and 150° C., can be used.

The duration of heating may be, for example, about 2 hours±30 minutes.

Preferably, cooling takes place in the pressing device, wherein rapid cooling additionally contributes to fixing the shape and facilitates immediate further processing of the airbag package.

The airbag package is preferably cooled after reaching the desired cross-sectional shape, thus causing said cross-sectional shape to be fixed similarly to a crease.

Cooling may be carried out, e.g., back to room temperature or to an even lower temperature, for example to about 0° C.

If is possible to remove the airbag package after cooling from the pressing device immediately after reaching the final temperature. However, it is also imaginable to maintain the airbag package for a further period of time at the final temperature, e.g. for about 30 minutes to 2 hours, so as to further fix the change of shape and volume obtained by compressing.

It is possible to provide the airbag roll, prior to introducing the same to the pressing device, with an appropriate coating which contributes to stabilizing the final shape of the airbag package upon compressing and subsequent heating and cooling.

In particular, the airbag is a curtain-type side airbag, but the method according to the invention may be conferred upon other types of airbags as well.

The manufactured airbag is especially rolled around its longitudinal axis and has a length of at least 1400 mm.

In accordance with another method according to the invention which moreover may comprise the afore-mentioned steps, the airbag is rolled into an airbag roll having a substantially circular cross-section, the airbag roll is fed to a pressing device and is compressed into an airbag package having opposite flat sides, with the airbag package especially taking a substantially rectangular cross-section.

The force by which the airbag roll is compressed may amount e.g. to about 12 kN.

By compressing basically also the stiffness of the airbag package increases, which counteracts twisting of the airbag package during installation on the vehicle.

The method according to the invention creates especially an airbag package having at least two opposite flat sides, e.g. having a rectangular cross-section, which excels by a significantly more favorable mounting shape. As compared to an airbag roll having a round cross-section, the airbag package manufactured by a method according to the invention has a smaller mounting depth, which is of advantage especially during mounting into the space behind a roof liner or behind lining parts, e.g. an A pillar. The accurate dimensions of the folded airbag can be determined by a corresponding configuration of the pressing device. In addition, the method according to the invention excels by its simplicity and low costs, as merely the common airbag roll having a substantially round cross-section is pressed into the desired shape by few short method steps. Complicated folding processes or fixations can be dispensed with. Therefore, a tight rolled airbag package having opposite flat sides which retains relative dimensional stability even in the further course of the module assembly can be easily manufactured by the method according to the invention.

In a first preferred variant, the airbag roll is fed to a molding shaft whose height corresponds substantially to the desired height of the finished airbag package. Such molding shaft offers a simple option of imparting the desired shape to the airbag roll.

In this context, it is pointed out that within the scope of the invention the height of the airbag package is meant to be a dimension of the airbag package normal to the centerline thereof (which, prior to compressing, corresponds to the longitudinal axis and the rolling axis of the airbag roll) and normal to the inserting direction of the airbag roll into the molding shaft; the other dimension normal to the centerline is referred to as width.

Accordingly, the selection of the terms of height and width is independent of the later mounting position of the airbag package or of the question which of the dimensions is the larger one.

According to a preferred embodiment, the airbag roll is pressed into the molding shaft whose height is smaller than the original diameter of the airbag roll. In this way, the airbag roll having a round cross-section is at first transformed to an airbag roll having an oval cross-section.

Alternatively, the height of the molding shaft might be as large as or even larger than the original diameter of the round airbag roll; in this case, pressing within the molding shaft is carried out in one inserting direction only which corresponds to a longitudinal direction of the molding shaft and to a passing direction of the airbag rolls through the molding shaft.

Of preference, the airbag roll is additionally pressed in the longitudinal direction of the molding shall so as to produce a substantially rectangular cross-section. Accordingly, the longitudinal direction corresponds, as already mentioned, to the passing direction of the airbag through the molding shaft.

When passing the molding shaft, the airbag extends especially with its longitudinal axis perpendicularly, i.e. transversely, to the inserting direction and thus to the longitudinal direction of the molding shaft.

Perpendicularly to the inserting direction along the longitudinal direction of the airbag roll, the molding shaft may extend to be curved at least in portions, wherein the airbag roll adopts the curvature of the molding shaft while it is reformed into the finished airbag package. It is equally possible that the height of the molding shaft varies along the longitudinal extension thereof. In this way, the finished airbag package can be largely adapted to the space available behind a roof rail lining, for example, and especially a lining of an A pillar of a vehicle.

An especially simple configuration is resulting when the pressing of the airbag roll in the longitudinal direction of the molding shaft is obtained by re-feeding further airbag rolls into the molding shaft. Each airbag newly introduced to the molding shaft consequently urges the preceding airbags along into the molding shaft, thus causing permanent pressure to act on the airbags inside the molding shaft. Consequently, a further pressing tool acting in the longitudinal direction optionally will be superfluous.

Alternatively, also the use of a pressing mold including a type of pressing die is imaginable, as a matter of course.

Especially it is also imaginable in this case to hold only a portion of the airbag roll within the pressing mold and to reform the same by compression, while the remaining airbag roll is not treated.

Preferably, then one end of the airbag roll is inserted into the pressing device, while the other end of the airbag roll protrudes from the pressing device.

The object stated in the beginning is equally achieved by a pressing device for molding airbag packages comprising a molding shaft whose height substantially corresponds to the desired height of the finished airbag packages, or a pressing mold, a heating means for heating the airbag packages as well as a cooling device for cooling the airbag packages. The pressing device according to the invention which is used especially for the afore-described methods according to the invention excels by a simple structure and enables rolled and/or folded airbags to be permanently transformed to a shape especially having opposite flat sides which is particularly favorable for mounting.

In a first preferred embodiment, the pressing device comprises a molding shaft. One end of the molding shaft may be a funnel-shaped receiving opening through which one or more airbag rolls can be fed to the pressing device.

The molding shaft is preferably open on the side opposite to the receiving opening so that the airbag rolls and, resp., airbag packages are pushed through the molding shaft, while reforming from the original airbag roll to the finished airbag package takes place.

The cooling device may be arranged downstream of the heating unit and may be further distant from the receiving opening than the heating unit, when viewed along the direction of movement of the airbag packages through the molding shaft.

An especially simple configuration of the pressing device is resulting when the molding shaft extends through the heating unit and the cooling device. Thus, the airbag rolls and, resp., airbag packages can be first heated and then cooled when passing the molding shaft.

The pressing device is preferably in the form of a passing device in which an airbag successively inserted into the molding shaft urges the preceding airbag along in the molding shaft. This results in a simple device in which even large piece numbers of airbag packages can be efficiently shaped.

In another preferred variant, instead of a molding shaft open on both sides a pressing mold is provided which includes a first molding part being closed on a side opposite to the receiving opening and at least a second molding part in the form of a pressing die that is adapted to engage in the first molding part so as to compress the airbag roll to form the airbag package. The closed side may either form a flat surface or may follow any complex contour which is adapted to the respective mounting space of the airbag package.

The pressing mold may have two parts but may as wall include further second molding parts which reform the airbag roll in portions.

By introducing the pressing die into the pressing mold, the airbag roll is uniaxially compressed. It is also possible to provide further pressing dies that engage in the molding shaft normal to the inserting direction and compress the airbag roll in a second direction. The further pressing die or dies may extend over the entire longitudinal extension of the molding shaft but may also be provided in particular portions of the molding shaft only in order to further reduce the diameter of the finished airbag package, for example, of the space available in the area of constrictions.

It is also imaginable to fold the airbag roll in total, before it is inserted into the pressing mold. This may be favorable for specific kinds of curtain type side airbags, for example, but also for other types of airbags.

Preferably, after compressing the airbag package remains in the pressing mold for the period of possible heating and cooling. After removing the finished airbag package, a new airbag roll can be inserted into the pressing mold.

The pressing mold may be open at least at one of its longitudinal ends so that pad of the airbag roll will protrude from the pressing mold and will not be reformed.

It is possible, instead of providing a separate heating unit end a separate cooling device at each pressing mold, to provide the pressing device in total with one single heating unit and one single cooling device arranged downstream thereof which are configured so that the pressing molds are moved through the latter.

According to a third aspect of the invention, an airbag package of the type mentioned in the beginning is provided which has a substantially rectangular cross-section. Such airbag package having a substantially rectangular cross-section takes a significantly more favorable mounting shape than an airbag roll having a round cross-section, as the mounting space available behind a roof liner or the lining parts inside the vehicle interior, for example, is usually flat.

According to a preferred embodiment, the airbag is ironed at opposed outsides defining the height of the airbag package. In this way, the airbag package will permanently retain its rectangular cross-section.

Preferably, the rolled airbag is an airbag which is wound exclusively into one single direction, i.e. either completely clockwise or completely anti-clockwise, when viewing the airbag package in cross-section. The lack of change of the winding direction renders the rolling process especially easy. In particular, the airbag package according to the invention is not folded in U-shape and, resp., includes no U-shaped folds, which facilitates the method of folding the airbag package. It is also imaginable, however, to produce the airbag roll by folding the airbag or by a combination of rolling and folding operations.

Moreover, all developments stated with reference to the method according to the invention are analogously applicable to the pressing device according to the invention as well as to the airbag package according to the invention, and vice versa. Also, all features of the different embodiments can be exchanged for each other or can be combined with each other at the skilled person's discretion.

BRIEF DESCRIPTION OF THE DRAWINGS

Hereinafter the invention shall be described in detail by way of plural embodiments and with reference to the enclosed drawings, wherein:

FIG. 1 shows a side view of an airbag illustrating a first step of a method according to the invention according to a first variant for folding an airbag;

FIG. 2 shows a schematic partial view of a pressing device according to the invention in accordance with a first embodiment in which a second step of the method according to the invention is carried out;

FIG. 5 shows a schematic view of a vehicle occupant restraint system comprising a side airbag disposed on a roof rail prior to deployment thereof, wherein the airbag is manufactured according to the method according to the invention and in the pressing device according to the invention;

FIG. 6 shows the vehicle occupant restraint system from FIG. 5 with the side airbag in the deployed state;

FIGS. 12a to 12d show different states which molecules of the airbag fabric may adopt during compression under thermal influence;

FIGS. 14a and 14b show another embodiment of a pressing device according to the invention for carrying out a method according to the invention.

DESCRIPTION

Figure 3:
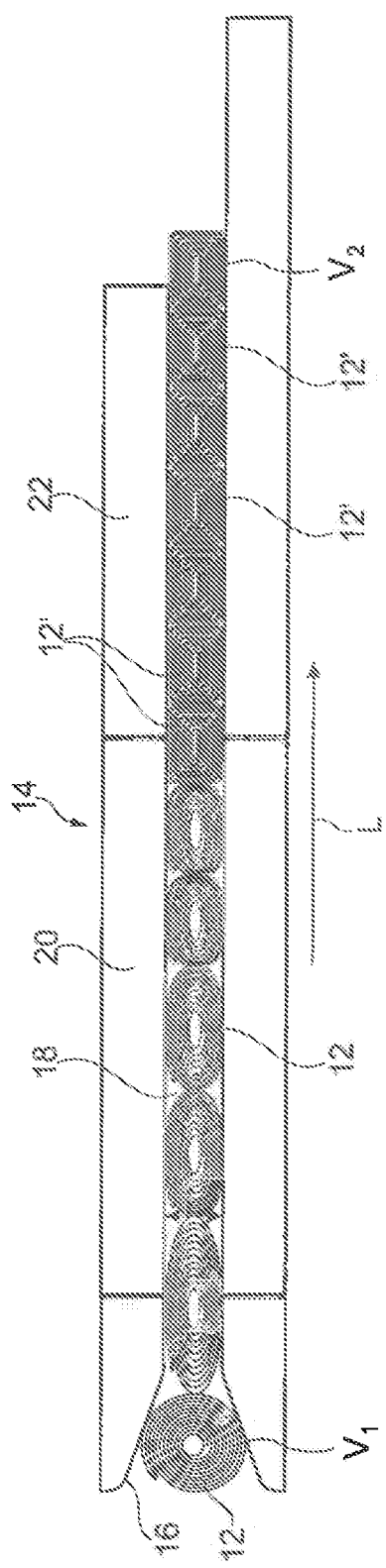
FIG. 3 shows a schematic side view of the pressing device from FIG. 2 illustrating the further steps of the method according to the invention.

FIGS. 1 to 4 illustrate a first variant of a method for folding an airbag 10 to form an airbag package 12'.

FIG. 1 illustrates the airbag 10 made from flat textile fabric for a vehicle occupant restraint system which in a first method step is rolled to form an airbag roll 12 having a substantially circular cross-section and a first volume $V_1$. The airbag 10 is a side airbag, for example, which is mounted in a housing between the body of the vehicle and a vehicle interior lining and protects the heads of the front and/or rear occupant(s) (cf. also FIGS. 5 and 6).

In this example, the airbag 10 is rolled merely in one single direction and thus has no U-shaped folds. However, especially also a combination of a rolling method and a folding method is imaginable in which the airbag 10 is folded in portions e.g. with one or more folds and for the rest is rolled.

The airbag roll 12 is rolled and/or folded normal to the longitudinal direction of the airbag 10, i.e. rolled around its longitudinal axis, for example.

After rolling and/or folding the airbag 10 to form the airbag roll 12, the airbag roll 12 is fed to a pressing device 14 (cf. FIG. 2) by inserting the airbag roll 12 in an inserting direction L into a funnel-shaped receiving opening 16 of the pressing device 14.

A molding shaft 18 whose height H substantially corresponds to the desired height h of the finished airbag package 12' is adjacent to the receiving opening 16. Since the height H of the molding shaft 18 is smaller then the original diameter D of the airbag roll 12, the airbag roll 12 is pressed, thus causing the airbag roll 12 to adopt an oval cross-section, as is evident from FIG. 2.

After compressing the airbag roll to its final height h, the airbag roll 12 in the molding shaft 18 passes through a heating unit 20 which heats the airbag roll 12.

At the same time, the airbag roll 12 is pressed also in the inserting direction L corresponding to a longitudinal direction of the molding shaft 18, viz. by refeeding further airbag rolls 12 into the molding shaft 16 so that a substantially rectangular cross-section is created (cf. also FIG. 3). In so doing, the first volume $V_1$ of the airbag roll 12 is reduced to the second volume $V_2$ of the airbag package 12'. The pressing device 14 thus is in the form of a passing device in which an airbag 10 subsequently inserted into the molding shaft 18 urges the preceding airbag 10 along within the molding shaft 18.

The airbag package 12' formed in this way from the airbag roll 12 is cooled to room temperature after being heated in the pressing device 14 by passing through a cooling device 22 arranged downstream of the heating unit 20. During cooling, the airbag packages 12' permanently exert mutual pressure in the longitudinal direction L so that the finished airbag packages 12' will permanently retain the volume $V_2$.

By cooling the airbag package 12' alter obtaining the desired cross-sectional shape, rectangular in this case, this shape is permanently fixed, which is comparable to introducing a crease to a fabric.

The molding shaft 18 extends both through the heating unit 20 and through the cooling device 22, which is resulting in an especially simple configuration of the pressing device 14.

Figure 4:
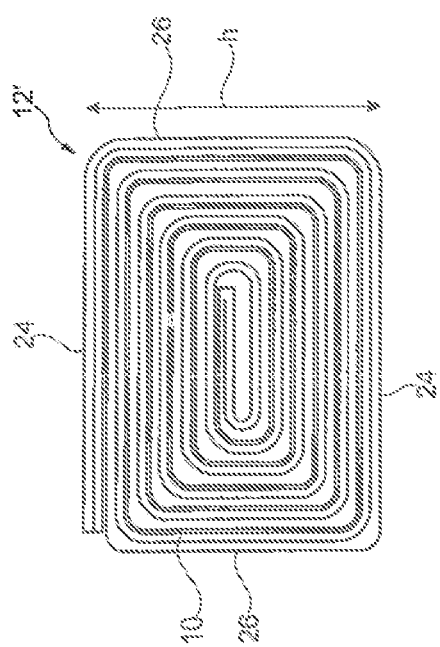
FIG. 4 shows a side view of an airbag package according to the invention manufactured by the method according to the invention.
Figure 7:
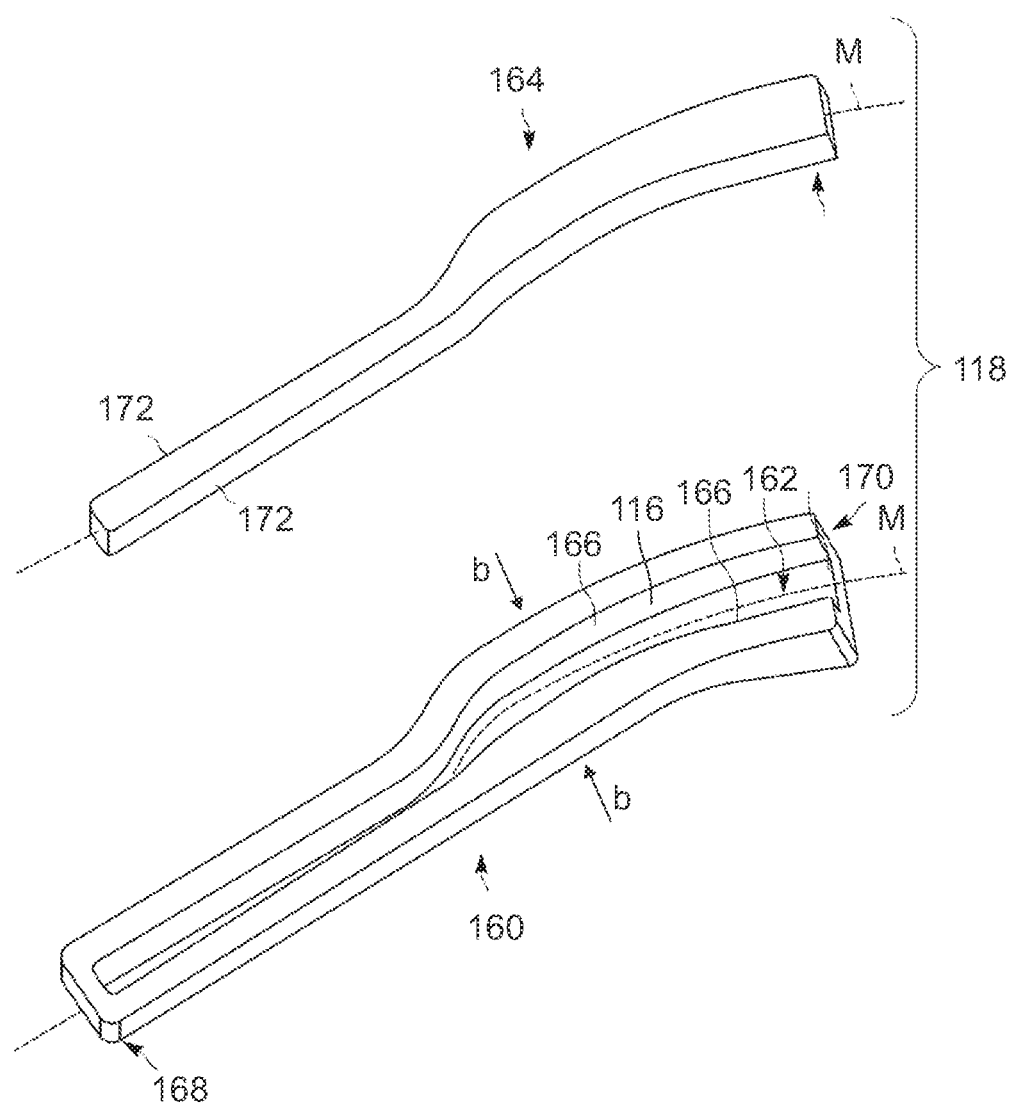
FIG. 7 shows a schematic perspective representation of a pressing mold of a pressing device according to the invention in accordance with a second embodiment for carrying out a method of the invention in accordance with a second variant.
Figure 8:
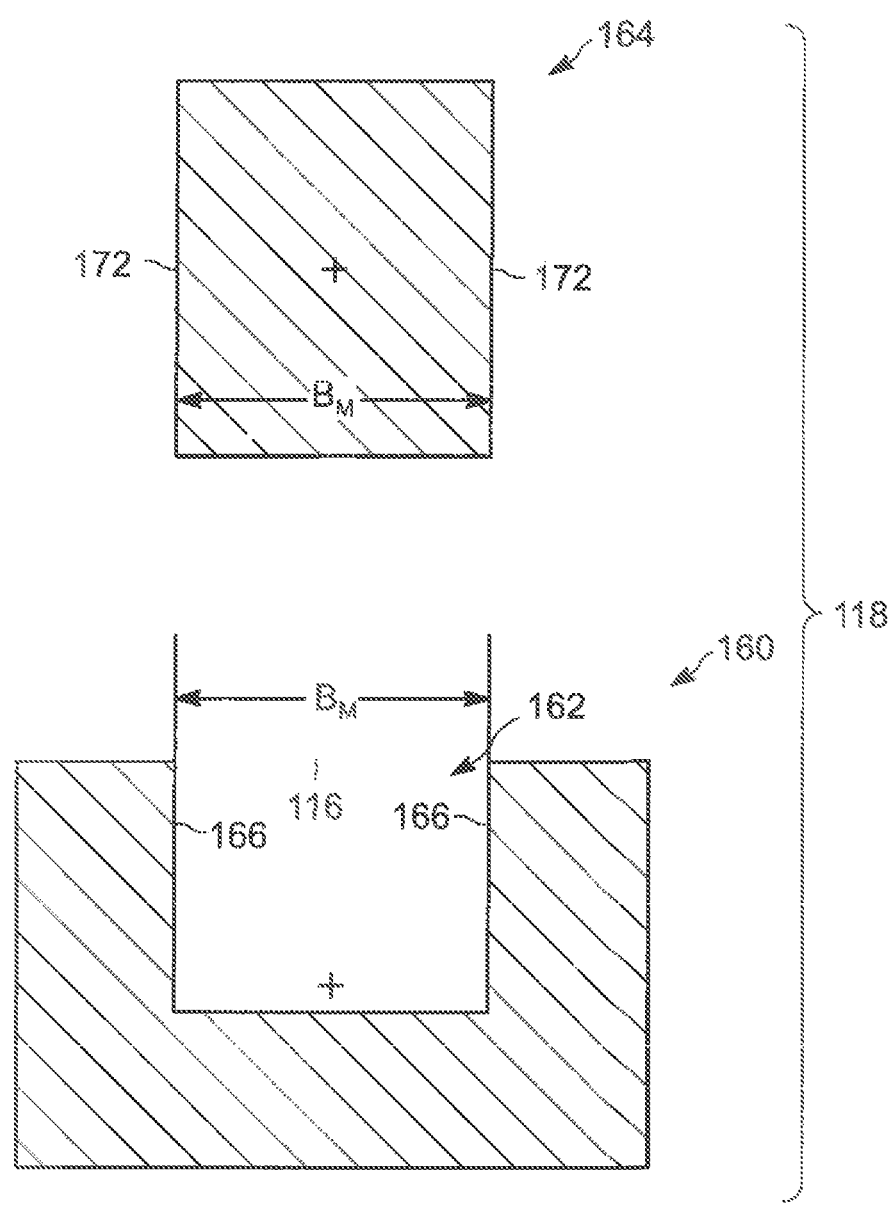
FIG. 8 shows a schematic sectional view of the pressing mold from FIG. 7.

FIG. 4 illustrates the airbag package 12' according to the invention manufactured by the method according to the invention which includes the rolled airbag 10.

The finished airbag package 12' includes opposite flat sides 24 and, resp., 26 and has a rectangular cross-section whose height h corresponds to the height H of the molding shaft 18.

After passing the heating unit 20 (as well as the downstream cooling device 22) the airbag 10 and, resp., the airbag package 12' is ironed at the opposite outsides 24 defining the height h, thus causing its shape to be permanently fixed.

As is shown in FIGS. 5 and 6, the airbag package 12' is provided for being mounted along a roof rail 40. In the illustrated case, it extends from an A pillar 42 above a B pillar 44 up to a C pillar 46 of the vehicle. Along its longitudinal extension, the airbag package 12' is mounted to the roof rail 40 by plural fastening clips 48.

The airbag 10 in this case is a curtain-type side airbag having a length of more than 1400 mm. The airbag 10 may be manufactured in any suitable way, e.g. one-piece woven of nylon or polyester yarn having approx. 235 to 700 DTEX, especially of PET having 470 DTEX.

In the deployed and inflated state, the airbag 10 in this case covers the side windows of the vehicle and offers protection for vehicle occupants on front and rear seats of the vehicle.

The airbag package 12' could also have a different length, however, e.g. for longer vehicles which include further vehicle pillars, or could be placed at a different position in the vehicle.

Especially, the inflated airbag has a total length of at least 1400 mm.

In order to inflate the airbag 10, an inflator 50 is provided for supplying the airbag with filling gas in a known way. The signal for activating the inflator 50 is supplied by a sensor unit 52 as is known.

The airbag package 12' follows the contour of the roof rail 40 so that a centerline M following the longitudinal extension of the airbag package 12' in the normal case does not extend linearly but may be bent, according to the curvature of the roof frame 40, in all spatial directions with a relatively large radius. In addition, the airbag package 12' may be curved more strongly within a small space so that it can be adapted in portions to smaller structures in the contour of the roof rail 40 such as handles or belt deflections.

In a cross-section in the area of the A pillar 42 the airbag package 12' has the dimensions of 500-900 mm by 22-35 mm, for example.

It is possible to coat the airbag 10 with a gas-impermeable material such as a urethane or a PVC-based coating, e.g. Gen 9, CS2 or silicone. If is also possible to select a coating which increases the permanent dimensional stability of the airbag package 12' during thermal treatment of the airbag package 12.

FIGS. 7 to 11 illustrate a second embodiment of a pressing device 114 for manufacturing a folded and pressed airbag package 12' end illustrate another method of manufacturing the airbag package 12'.

The pressing device 114 includes a pressing mold 118 which in this example is in two parts. A first molding part 160 has a trough 162 whose shape is an image of the desired final shape of the airbag package 12'. The trough 162 defines the centerline M of the finished airbag package 12' which follows the longitudinal extension of the trough 162. Corresponding to the contour of the roof rail 40, also the centerline M may extend in a curved shape.

A second molding part 164 is in the form of a pressing die and may be fitted accurately into the trough 162 of the first molding part 160 so as to compress an airbag roll 12 received in the trough 162.

The pressing form 118 is made from stable and properly heat-conducting material for example from aluminum or steel.

The width $B_M$ of the trough 162 defining one of the dimensions of the airbag package 12'. In this case varies along the centerline M. Depending on the chosen contours of the first and second molding parts 180, 164, also the height $H_M$ of the trough 162 may vary in the closed state of the pressing mold 114 defining a second dimension of the finished airbag package 12' (cf. e.g. FIGS. 9c and 11).

The sidewalls 166 of the trough 162 defining the outsides 24, 26 of the finished airbag package 12' in this example extend perpendicularly.

The pressing mold 118 in this example has a first longitudinal-side end 168 at which the trough 162 is formed to be closed as well as a second longitudinal-side end 170 at which the trough 162 is open. Equally, it would be possible in alternative embodiments to design the trough 162 to be closed or open at both longitudinal-side ends 168, 170.

Figure 9A:
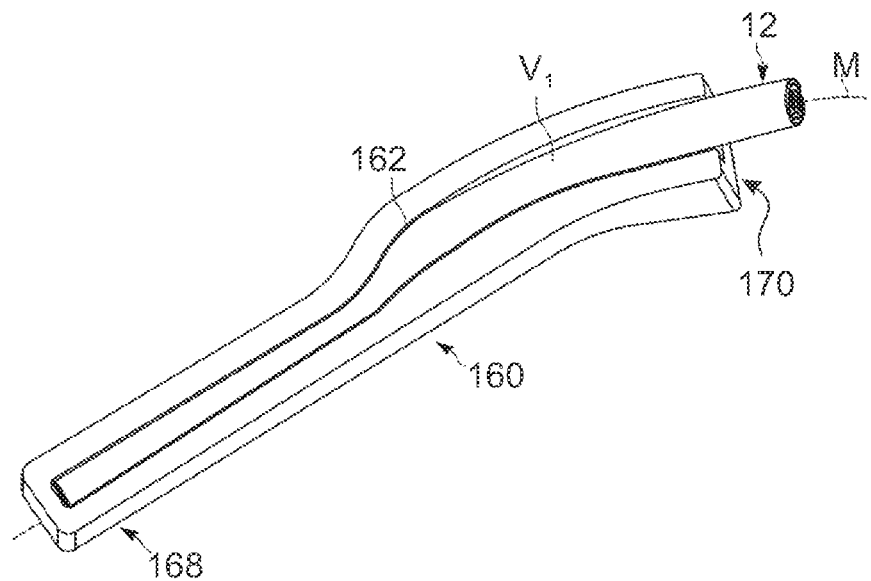
FIG. 9a shows a schematic perspective view of the pressing mold from FIG. 8 with an inserted airbag roll.
Figure 9B:
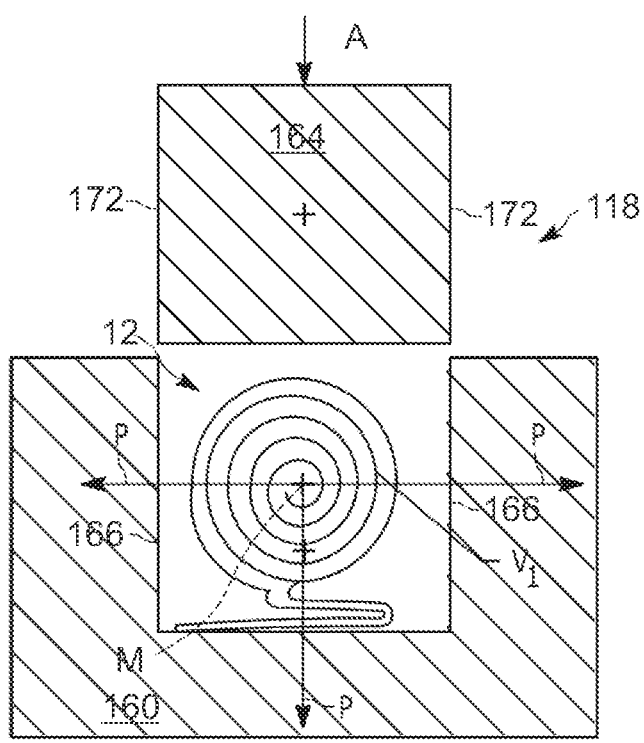
FIG. 9b shows a schematic sectional view of the pressing mold from FIG. 7 with an inserted airbag roll.
Figure 9C:
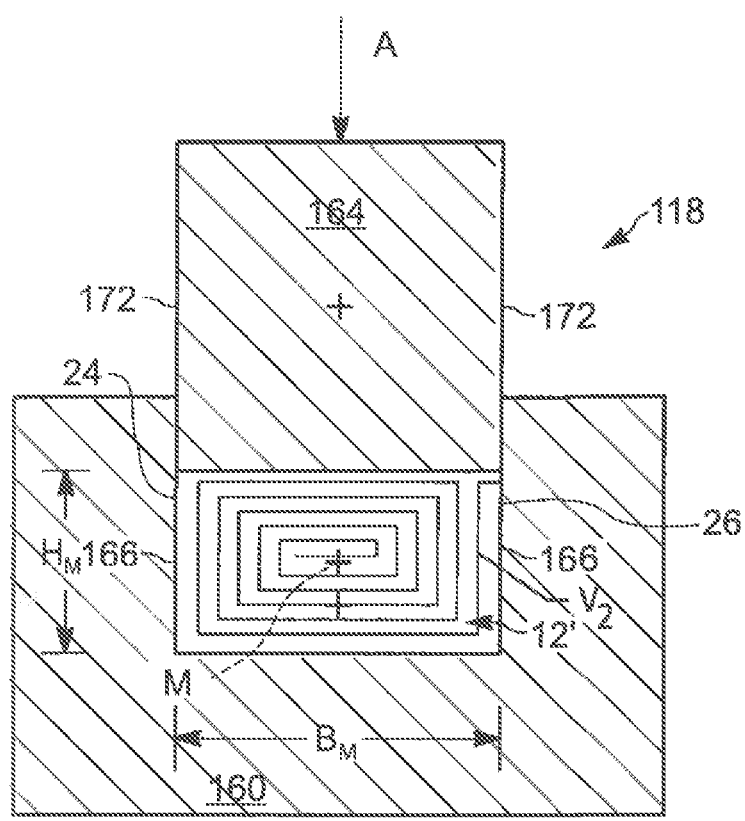
FIG. 9c shows a schematic sectional view of the pressing mold from FIG. 7 after compressing the airbag roll.

FIGS. 9a to 9c illustrate manufacturing steps according to a method of the invention for manufacturing a finished airbag package 12' using the pressing mold 118.

As in the first variant, initially the airbag 10 is folded to form an airbag roll 12 having a substantially circular cross-section. The airbag roll 12 is inserted into the trough 162 of the first molding part 160 of the pressing mold 118. In this example, the portion of the airbag roll 12 which is later arranged along the A pillar 42 is located within the trough 162, while part of the airbag roll 12, especially a portion which is later placed along the C pillar 46 projects from the pressing mold 118 beyond the open and 170 of the trough 182.

Due to the shape of the trough 182, the airbag roll 12 is enclosed by the first molding part 160 on three sides.

The second molding part 164 is now inserted into the trough 162 along a pressing direction A, as shown in FIG. 9c, wherein the vertical outer surfaces 172 of the second molding part 164 slide along the vertical side faces 166 of the trough. The airbag roll 12 is compressed and reformed, wherein if varies its outer contours according to the pressing mold 118. The pressing force by which the second molding part 164 is forced into the trough 162 may be about 12 kN, for example. During this step, the volume $V_1$ of the airbag roll 12 is reduced to the smaller volume $V_2$ of the airbag package 12'.

The airbag roll 12 is uniaxially compressed by the movement of the second molding part 164. Since the material of the airbag roll 12 tends to laterally deflect, the trough 162 is completely filled by the forming airbag package 12', and the airbag roll 12 is pressed against the sidewalls 166 of the trough 162. The airbag package 12' forming in this way adopts the shape of the inner contour of the trough 162 and of the end face of the second molding part 164.

The compression also ensures air inclusions inside the airbag 10 to be removed, for example air which is left inside the airbag roll 12 during rolling and/or folding of the airbag 10.

Figure 10:
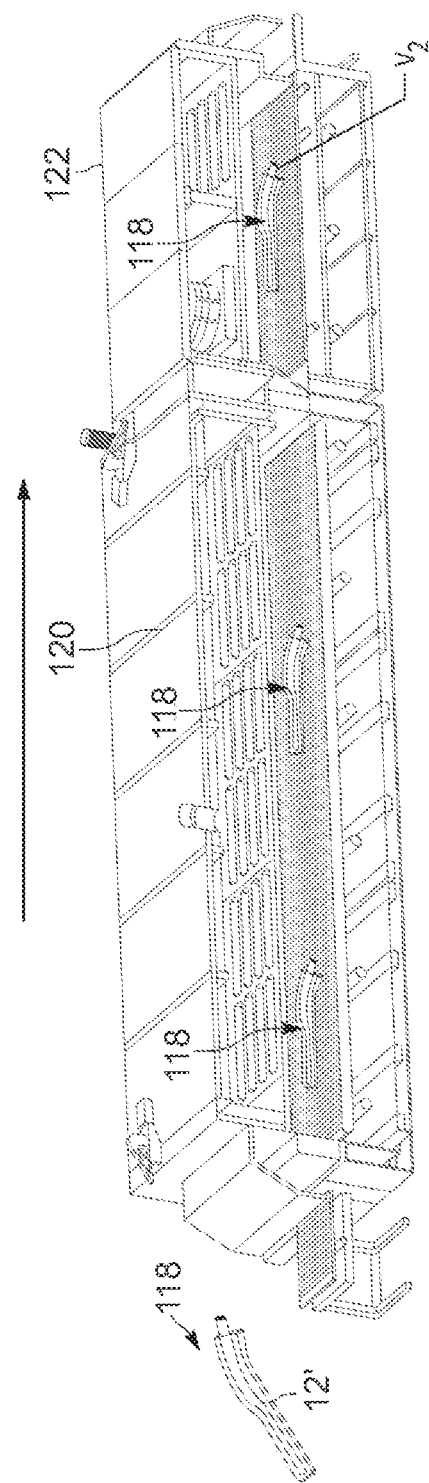
FIG. 10 shows a schematic representation of the pressing device according to the invention in accordance with the second embodiment including a heating unit and a cooling device.
Figure 11:
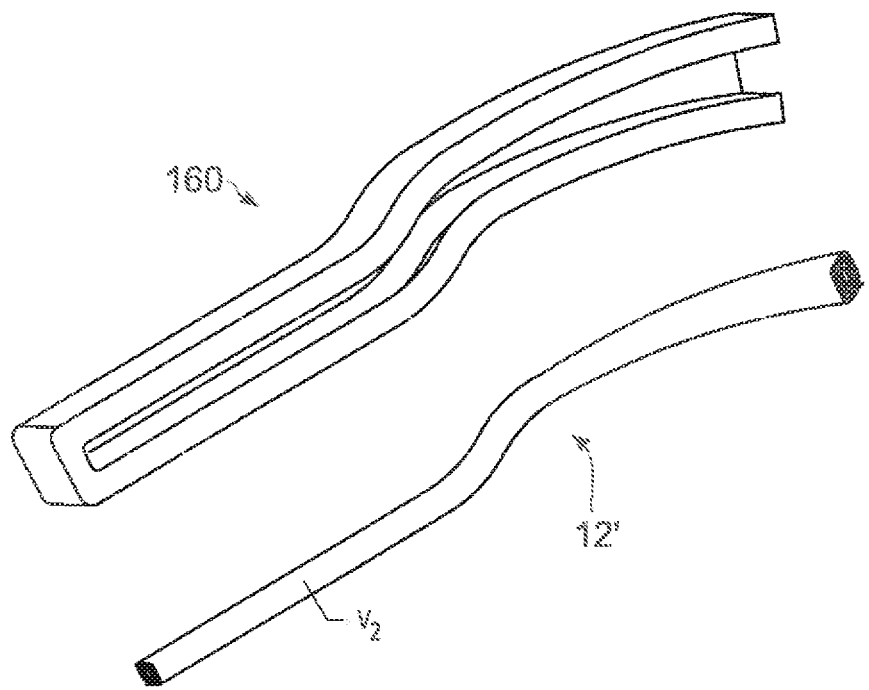
FIG. 11 shows a schematic representation of the pressing mold of the pressing device according to the invention in accordance with the second embodiment as well as of a finished airbag package according to the invention.

In order to fix the airbag package 12' more properly in the form obtained by compressing and having the volume $V_2$, the pressing device 114 includes a heating unit 120 and a cooling device 122 arranged downstream thereof. An example hereof is illustrated in FIG. 10.

The airbag package 12' initially remains in the closed pressing mold 118 and together with the same is moved to the area of the heating unit 120.

There heat will act at a temperature within a range of from about 80° C. to 170° C. for e.g. about 2 hours.

Subsequently, the airbag package 12' is displaced still within the pressing mold 118 in the area of the cooling device 122 (cf. arrow in FIG. 10) and is rapidly cooled there, for example to a temperature of about 0° C. for a period of about 30 minutes.

During said thermoforming by thermal and cooling treatment, the pressing mold 118 remains closed, especially the second molding part 164 remains fixed at the position at which the final volume $V_2$ of the airbag package 12' has been reached.

When the cooling phase is completed, the now permanently dimensionally stable airbag package 12' is removed from the pressing mold 118.

The finished airbag package 12' for example has the dimensions of about 11 mm in one dimension and of about 32 mm in a second dimension perpendicular thereto. The length of the airbag package 12' along the centerline M in this case remains unchanged vis-à-vis that of the airbag roll 12, as in this direction no upsetting forces are acting upon the airbag roll 12.

In a different example, the finished airbag package 12' has the cross-sectional dimensions of about 15 mm by about 20 mm.

During heating and cooling, internal forces are acting inside the material of the airbag fabric. On a microscopic level, said forces are caused mainly by the stiffness of molecular bonds in an amorphous state. The stiffness originates from energy differences in different cis-trans-gauche-conformations of the molecular chains and of the secondary valences along the chains, i.e. both from intramolecular and from intermolecular interactions. The supplied thermal energy is sufficient to increase the mobility of the molecules so far that such tensions may be decreased and the molecules may newly align inside the molecular chain as well as with each other. In the following cooling step, the energy is removed again so that the molecular chains will freeze in the new conformation. Therefore, the cooled airbag package 12' is independently and permanently retained in the predetermined form, even if it is removed from the pressing mold 118.

FIGS. 12a to 12d illustrate four phases of aligning the molecules within the material of the airbag fabric, while the airbag package 12' is made to adopt its final shape.

Figure 12A:
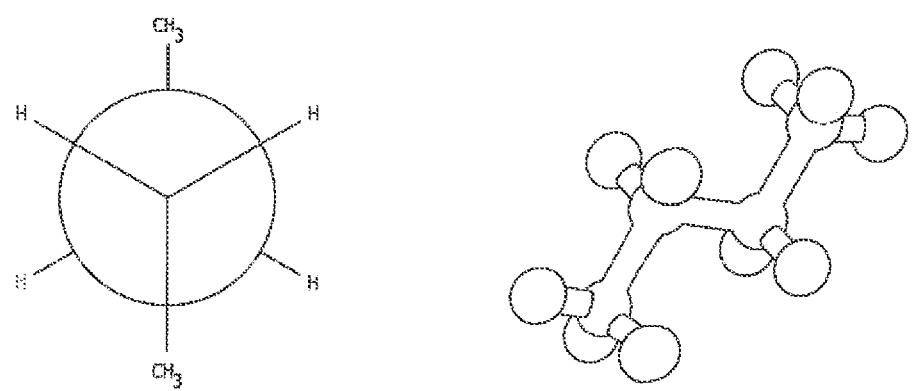

FIG. 12a shows the molecules in their original non-compressed form without any external tensions. In this state, the C—C bonding angles form a tetrahedral angle.

As is illustrated in FIG. 12b, the rolling and/or folding of the airbag 10 and the subsequent compressing of the airbag roll 12 will result in bending of the molecules and thus in a deviation from the tetrahedral angle. Therefrom internal tensions within the molecules are resulting.

FIG. 12c shows the reaction of the molecules to the thermal impact. In this state, the molecules rotate by +/−120° about their longitudinal axis due to the thermal activation. With a continued thermal impact, the internal tensions are gradually reduced. The bonding angles will adapt and return to their original tetrahedral angles. FIG. 12d finally illustrates how the molecules behave in response to the cooling. In this state, the airbag package 12' retains the shape predefined by the pressing mold 118 which now represents the most favorable state as regards the bonding energies. Rapid cooling terminates further rotation of the molecules so that the airbag package 12' is thermally fixed in a permanently stable configuration and the shape and the volume $V_2$ will not change any more even after removal from the pressing mold 118. This is a general effect occurring during thermoforming which is also applicable to the method of the first embodiment, as a matter of course.

Figure 13:
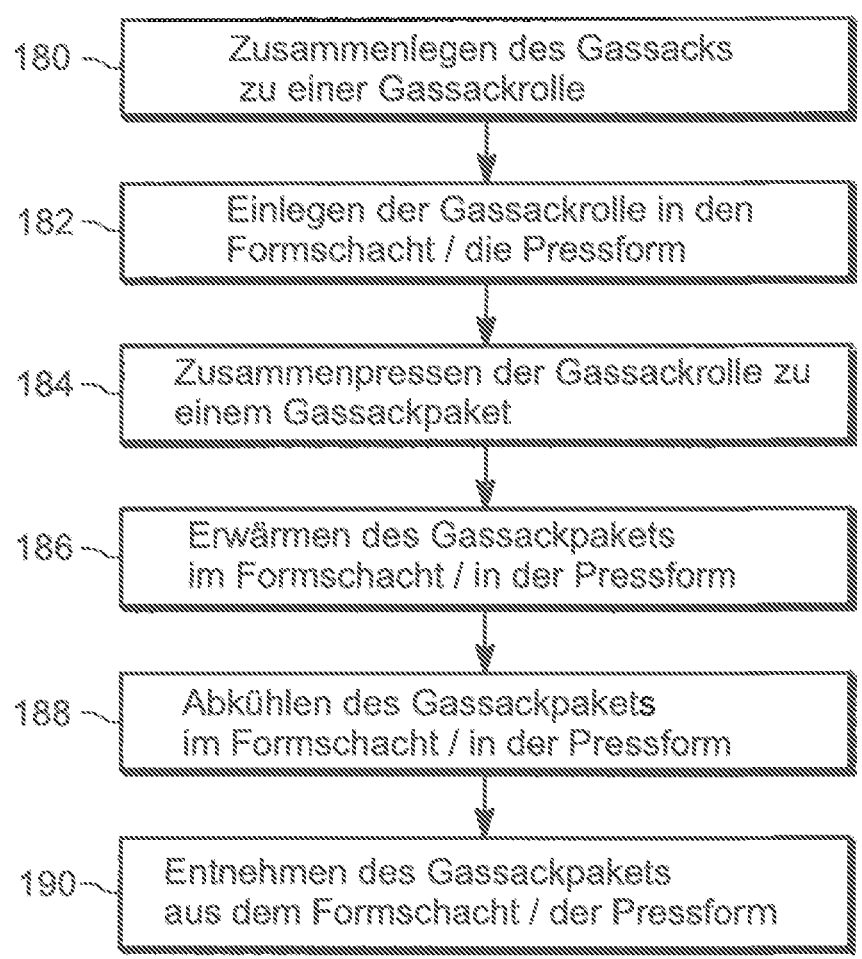
FIG. 13 shows a flow diagram illustrating the individual steps of a method according to the invention.

FIG. 13 schematically illustrates general method steps of the method according to the invention. In step 180, the airbag 10 is folded by folding and/or rolling into an airbag roll 12 having a volume $V_1$. In step 182, the airbag roll 12 is inserted into a molding shaft 18 or a pressing mold 118 of a pressing device 14, 114. In step 184, the airbag roll 12 is compressed to form an airbag package 12' having a smaller final volume $V_2$. The compressed airbag package 12' is heated, in step 186, within the molding shaft 18 or within the pressing mold 118 for a predetermined time to a predetermined temperature. In step 188, the airbag package 12' is rapidly cooled within the molding shaft 18 or within the pressing mold 118 to a predetermined temperature and for a predetermined duration. Finally, in step 190 the permanently dimensionally stable airbag package 12' is removed from the molding shaft 18 or from the pressing mold 118, wherein it permanently retains its predefined shape and the volume $V_2$ without any extreme fixation by strips or housings being necessary.

The shaping method according to the invention for the airbag package 12' cannot only be used, as described, for curtain-type side airbags of any length but also for airbags disposed in the instrument panel, in the steering wheel, in a seat frame, in a vehicle door or in a headrest, for example.

In any case, the molding shaft 18 or the pressing mold 118 has to be adapted to the desired shape of the airbag package 12', of course.

In the case of a curtain-type side airbag, the shaping of the airbag package 12' may also include the bypassing of handles, belt deflections and drain grooves within the vehicle body. Accordingly, also strongly wound contours can be realized.

Figure 14A:
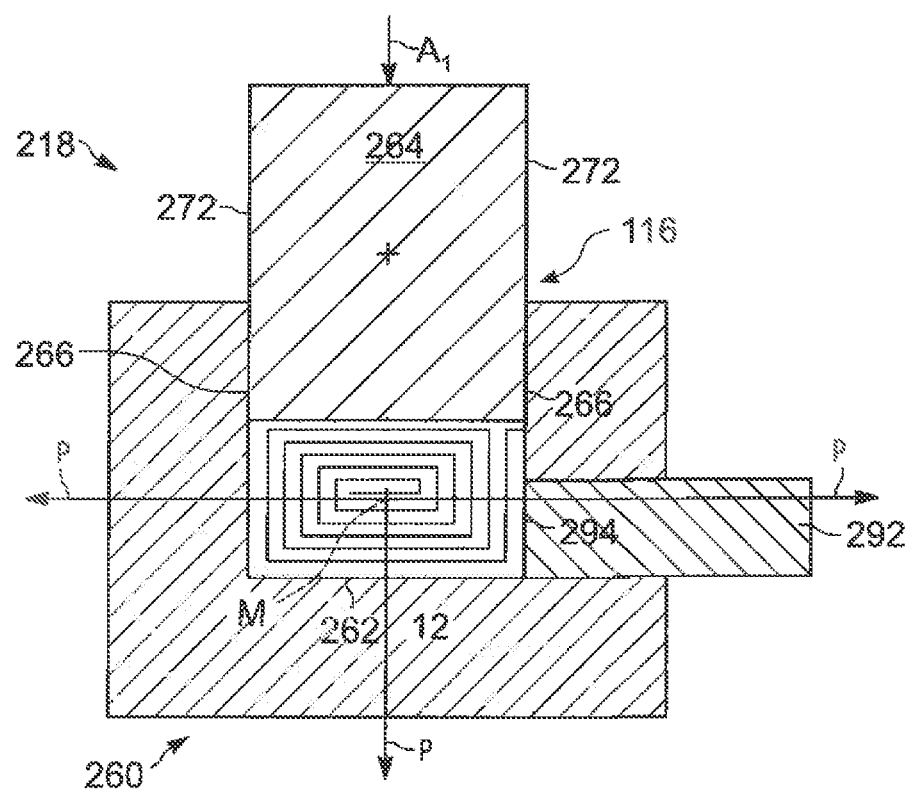

FIGS. 14a and 14b illustrate a further embodiment of a pressing mold 213 which may be utilized, for example, along with a pressing device 114 as afore-described.

In contrast to the afore-described pressing mold 118, the pressing mold 213 is not only configured in two parts but, in addition to the first molding part 260 and the second molding part 264, has at least one further movable second molding part 292 which is capable of engaging in the trough 262 in the first molding part 260.

The further molding part 292 is in the form of a pressing die and initially is retracted so far that it is located in the surface of one of the vertical sidewalls 266 of the trough 262.

After inserting the airbag roll 12 into the trough 262, first the second molding part 264 is moved in a first pressing direction $A_1$ into the trough 262, with a first compression being imparted to the airbag roll 12 (see FIG. 14A).

While the second molding part 264 is retained in its displaced position, now the further molding part 292 is moved into the trough 262, wherein the airbag roll 12 is further compressed in a pressing direction $A_2$ other than by the second molding part 264. Thus, the airbag roll 12 can be deformed biaxially in the pressing mold 218.

The further movable molding part 292 may be provided over the entire longitudinal extension of the trough 262, but advantageously it is provided in portions only, for example in order to compress the airbag package 121 more strongly at particular points which are correlated, in the mounted state, with a handle or a belt deflection, for example.

As afore-described, the airbag package 12' is initially heated still in the pressing mold 218 including inserted molding parts 284, 292 and is then cooled again so as to thermally stabilize the airbag package 12' in its new shape and in its final volume $V_2$. In order to remove the finished airbag package 12' from the pressing mold 218, the movable molding parts 292, 264 are withdrawn so that the receiving opening 116 within the first molding part 260 becomes accessible again.

In this example, the height of the further movable molding part 292 is in conformity with a final dimension of the finished airbag package 12', but it is also possible to compress the already pre-compressed airbag roll 12 only in part by the further molding part 292. The end face 294 of the molding part 292 acting upon the airbag roll 12 may have any cross-section. In this example said cross-section is rectangular.

The invention claimed is:

1. A method of folding a curtain-type side airbag (10) for a vehicle occupant restraint system, to form an airbag package (12'), wherein the following steps of:
    rolling and/or folding the airbag (10) to form an airbag roll (12) having a first volume ($V_1$);
    feeding the airbag roll (12) to a pressing device (14; 114);
    compressing the airbag roll (12) to form an airbag package (12') having a second volume ($V_2$) which is smaller than the first volume ($V_1$);
    heating the airbag roll (12) and, resp., the airbag package (12') within the pressing device (14; 114); and
    cooling the airbag package (12'), wherein the airbag package (12') maintains the second volume ($V_2$) when it is removed from the pressing device (14; 114).

2. The method of folding an airbag (10) for a vehicle occupant restraint system to form an airbag package (12') according to claim 1, by the following steps of:
    rolling the airbag (10) to form an airbag roll (12) having a substantially circular cross-section;
    feeding the airbag roll (10) to a pressing device (14; 114); and
    compressing the airbag roll (12) to form an airbag package (12') having opposite flat sides (24, 26), especially having a substantially rectangular cross-section.

3. The method according to claim 1, wherein the airbag package (12') is heated after compressing to its final height (h) within the pressing device (14).

4. The method according to claim 1, wherein the airbag package (12') is cooled after reaching the desired cross-sectional shape within the pressing device (14).

5. The method according to claim 1, wherein the airbag roll (12) is fed to a molding shaft (18) the height (H) of which substantially corresponds to the desired height (h) of the finished airbag package (12').

6. The method according to claim 5, wherein the airbag roll (12) is pressed into the molding shaft (18) the height (H) of which is smaller than the original diameter (D) of the airbag roll (12).

7. The method according to claim 5, wherein the airbag roll (12) is additionally pressed in the longitudinal direction (L) of the molding shaft (18) so as to create a substantially rectangular cross-section.

8. The method according to claim 1, wherein the pressing device extends to be curved at least in portions along the longitudinal direction of the airbag roll.

9. The method according to claim 1, wherein the airbag roll (12) is pressed in the longitudinal direction (L) of the molding shaft (18) by re-feeding further airbag rolls (12) into the molding shaft (18).

* * * * *